(12) United States Patent
Notaras et al.

(10) Patent No.: US 6,179,059 B1
(45) Date of Patent: Jan. 30, 2001

(54) CUTTING BLADES

(76) Inventors: John Arthur Notaras; Angelo Lambrinos Notaras, both of 9 Fred Street, Lilyfield, New South Wales, 2040 (AU)

(*) Notice: Under 35 U.S.C. 154(b), the term of this patent shall be extended for 0 days.

(21) Appl. No.: 09/329,600

(22) Filed: Jun. 10, 1999

Related U.S. Application Data

(63) Continuation-in-part of application No. 08/864,570, filed on May 28, 1997, now abandoned.

(30) Foreign Application Priority Data

May 28, 1996 (AU) .................................................. PO0123
May 21, 1997 (AU) .................................................. 23549/97

(51) Int. Cl.⁷ .................................................. A01D 53/14
(52) U.S. Cl. .................................................. 172/17; 56/256
(58) Field of Search .................................................. 56/255, 256, 295, 56/DIG. 17; 172/13, 15, 16, 17

(56) References Cited

U.S. PATENT DOCUMENTS

| | | | |
|---|---|---|---|
| Re. 32,266 | 10/1986 | Toggle et al. | 172/15 |
| 2,976,666 * | 3/1961 | Machovec | 56/256 X |
| 3,006,421 * | 10/1961 | Feilbach | 172/15 |
| 4,653,590 | 3/1987 | Shank | 172/15 |
| 5,209,052 * | 5/1993 | Carroll | 5/255 |
| 5,267,429 | 12/1993 | Kettler et al. | 56/295 |

* cited by examiner

*Primary Examiner*—Robert E. Pezzuto
(74) *Attorney, Agent, or Firm*—Ladas and Parry

(57) ABSTRACT

A dual blade assembly for a lawn edger, the assembly comprising first (140) and second (142) generally rectangular blades arranged in a substantially cross shaped configuration for rotation about a substantially central axis (R). Each of the first (140) and second (142) blades having a central region between two end cutting regions, at least one protuberance (144) in the central region and at least one recess (148) in the central region. The promuberance(s) (144) of one of the first (140) and second (142) blades is adapted to engage with the recess(es) (148) of the other of the first (140) and second (142) blades to counteract relative movement between the first (140) and second blades (142) about the rotational axis (R).

8 Claims, 11 Drawing Sheets

CUTTING BLADES

This application is a CIP of U.S. patent application Ser. No. 08/864570 filed on May 28, 1997, now abandond.

FIELD OF THE INVENTION

The present invention relates to cutting blades and, in particular, to a dual blade assembly for a motorised lawn edging implement.

BACKGROUND OF THE INVENTION

The maintenance of a tidy natural outdoor landscape includes the regular edging or cutting of the growth of grass, plants and other vegetation along the edges of paths, curbs and gutters, garden plots, walls, fences, etc. Various methods have been used to perform these and similar tasks, using manual and motor-assisted equipment. The latter are tenned "edgers" and are increasing in popularity.

It is known for edgers to use a flat rectangular blade with at least one fixing hole in the blade. If only one hole is used, it is at the centre of the blade. Alternatively, a cutting disc with teeth disposed around its circumference is used.

During the edging or cutting process, and particularly with professional garden maintenance, it is desirable to minimise the overall time required to complete the task. It is also desirable to minimise the quantity of energy consumed, to increase the overall efficiency of the task.

It is also desirable to maximise the operator's comfort, which can be adversely affected when motor assisted equipment creates excessive movement and/or vibration, due to the inpact of the rotating blade on dirt, rocks and the like.

It is also desirable to minimise the storage space required by large quantities of cutting blades in the manufacturing and distribution stages of production.

Finally, it is desirable in some situations for an operator to have the ability to vary the width of the cut that the blade makes.

SUMMARY OF THE INVENTION

In the first aspect, the present invention discloses a dual blade assembly for a lawn edger, the assembly comprising first and second generally rectangular blades arranged in a substantially cross shaped configuration for rotation about a substantially central axis, each of the first and second blades having: a central region between two end cutting regions; at least one protuberance in the central region; and at least one recess in the central region, wherein the protuberance(s) of one of the first and second blades is adapted to engage with the recess(es) of the other of the first and second blades to counteract relative movement between the first and second blades about the rotational axis.

In the second aspect, the present invention discloses a dual blade assembly for a lawn edger, the assembly comprising first and second generally rectangular blades arranged in a substantially cross shaped configuration for rotation about a substantially central axis, each of the first and second blades being of substantially constant thickness prior to any deformation and having a central region between two end cutting regions, at least one of the first or second blades being deformed by having its end regions displaced axially from its central region, the axial distance between the opposed outermost surfaces of each of the first and second blades defining a cutting width, and wherein the first and second blades are arranged with the displaced end regions being disposed axially inwardly such that the cutting width of the blade assembly is less than or equal to twice the blade thickness of the first and second blade.

In the third aspect, the present invention discloses a dual blade assembly for a lawn edger, the assembly comprising:

first and second generally rectangular blades arranged in a substantially cross-shaped configuration for rotation about a substantially central axis, each of the first and second blades being of substantially constant thickness prior to any deformation and having a central region between two end cutting regions; and means for maintaining said first and second blades in a fixed rotational relationship with respect to each other, said means comprising at least one of the first and second blades being deformed by having its end regions displaced axially from its central region forming a central deformation shaped to receive the other of the first and second blades, wherein the axial distance between the opposed outermost surfaces of terminal cutting edges of the end regions of the first and second blades defines a cutting width and the first and second blades are arranged with the displaced end regions being disposed axially inwardly such that the cutting width as defined by the terminal cutting edges of the end regions of the first and second blades is less than or equal to twice the blade thickness.

BRIEF DESCRIPTION OF THE DRAWINGS

A number of embodiments of the present invention will now be described by way of example, with reference to the accompanying drawings, wherein.

DETAILED DESCRIPTION

Figure 1:
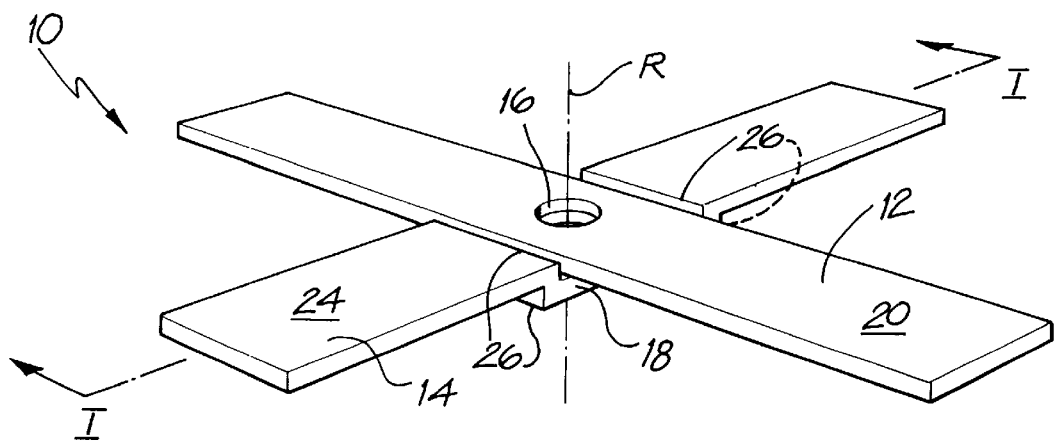
FIG. 1 is a perspective view of a dual blade assembly in accordance with a first embodiment.
Figure 2:
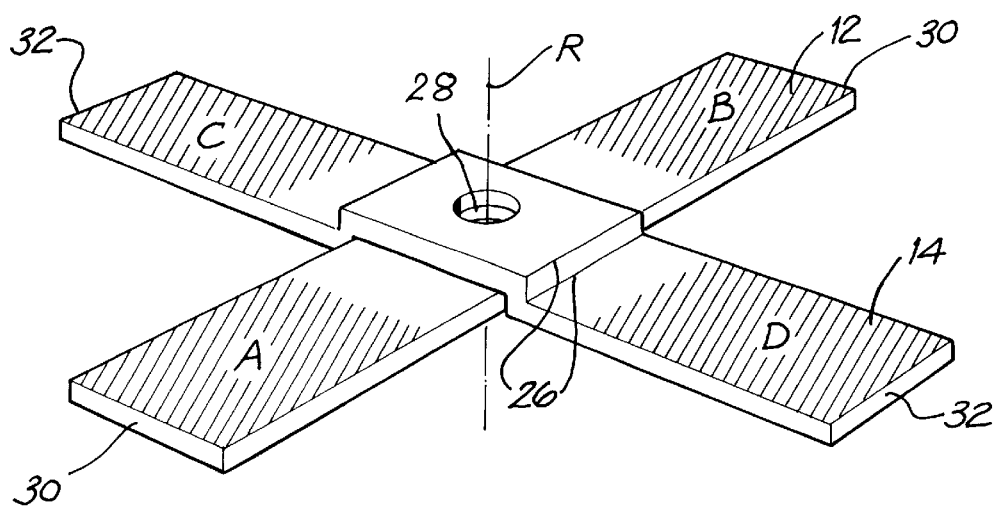
FIG. 2 is an inverted perspective view of Be dual blade assembly of FIG. 1.
Figure 3:
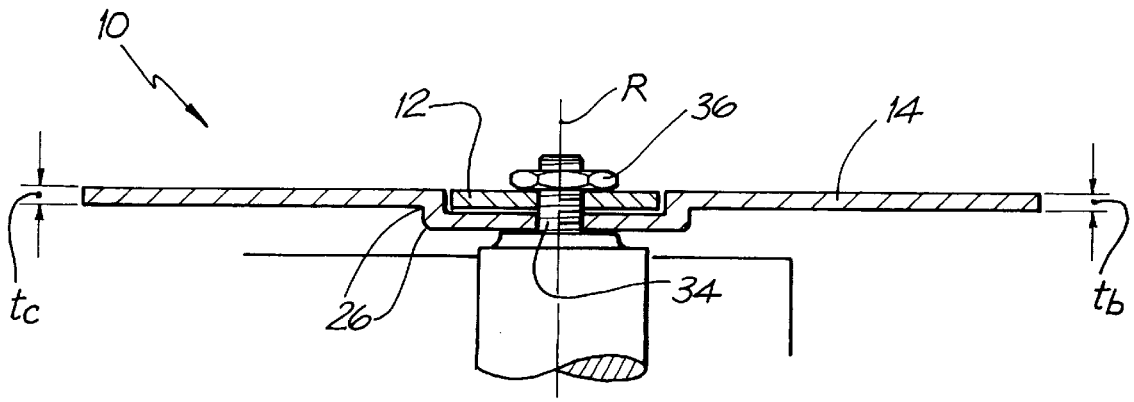
FIG. 3 is a schematic sectional side view of the dual blade assembly of FIG. 1 along the line I—I of FIG. 1, together with a fastener to demonstrate the attachment to a lawn trimming implement.

Referring to FIGS. 1 to 3, there is shown a first embodiment of a dual blade assembly 10 having a first blade 12 and a second blade 14. The first blade 12 is a flat rectangular plate typically having a blade thickness $t_b$ (FIG. 3) of approximately 2 mm (although the invention is not limited thereto), preferably manufactured of hardened spring steel with a fixing hole 16 provided centrally about a rotational axis R. The second blade 14 is substantially identical in overall length and thickness to the first blade 12. However, the second blade 14 has central deformation 18 shaped to receive the first blade 12. In this first embodiment, the central deformation 18 is such that it axially displaces upper surface 24 of the end or cutting regions of the second blade 14 by approximately 2 mm (i.e. by substantially the same thickness as for the first blade 12).

This results in the upper surface 20 of the first blade 12 being level with, or substntially level with, upper surface 24 of the second blade 14 and giving the assembly a cutting width or thickness $t_c$ (FIG. 3) of approximately 2 mm (i.e. approximately equal to the blade thickness $t_b$).

In this embodiment, the dimension of the central deformation 18 along the length of the second blade 14 is substantially equal to the width of the first blade 12. The central deformation 18 is also characterised by substantially right angled bend regions 26.

As shown in FIG. 2, the second blade 14 also has a fixing hole 28 provided centrally about the axis R, so that when the first blade 12 and the second blade 14 are assembled as shown, the fixing holes 16 and 28 align to receive a common fixing device. When attached to a lawn edging implement, tips 30 and 32 of the blades 12 and 14 respectively, strike the grass when in use. The blades 12, 14 wear from each of the tips 30, 32 back towards the frog holes 16 and 28.

The shaded areas A, B, C & D indicate the material that usually wears away. This can be contrasted with the wearing away of a (higher cost) disc blade having a larger surface area and thus more steel, where he perimeter teeth wear and become blunt. The disc blade as a whole is then ineffective and the remaining steel of the disc is unable to assist in the intended cutting operation.

The blade arrangement provides a desirable result whereby a multi-edged, flat plane, cutting blade (in the effective cutting area) with at least four cutting edges is provided, at a lower cost of manufacture than a cutting disc with teeth disposed around its circumference, and a longer life than a cutting disc with teeth.

The central deformation 18 locates about the blade 12 to act as a torque resisting means and counteract any relative rotational movement of the blades 12 and 14 about the axis R. Thus in operation the blades 12, 14 maintain their illustrated substantially perpendicular relationship.

As illustrated in FIG. 3, the dual blade assembly 10, is detachably mounted to an edging implement's horizontal shaft 34 using a fastener 36, for example a nut, which threadably engages the shaft 34. The first blade 12 in FIG. 3 is at the outer position on the shaft 34. However, this arrangement can also be reversed, so that the second blade 14 is in the outer position on the shaft 34.

Figure 4:
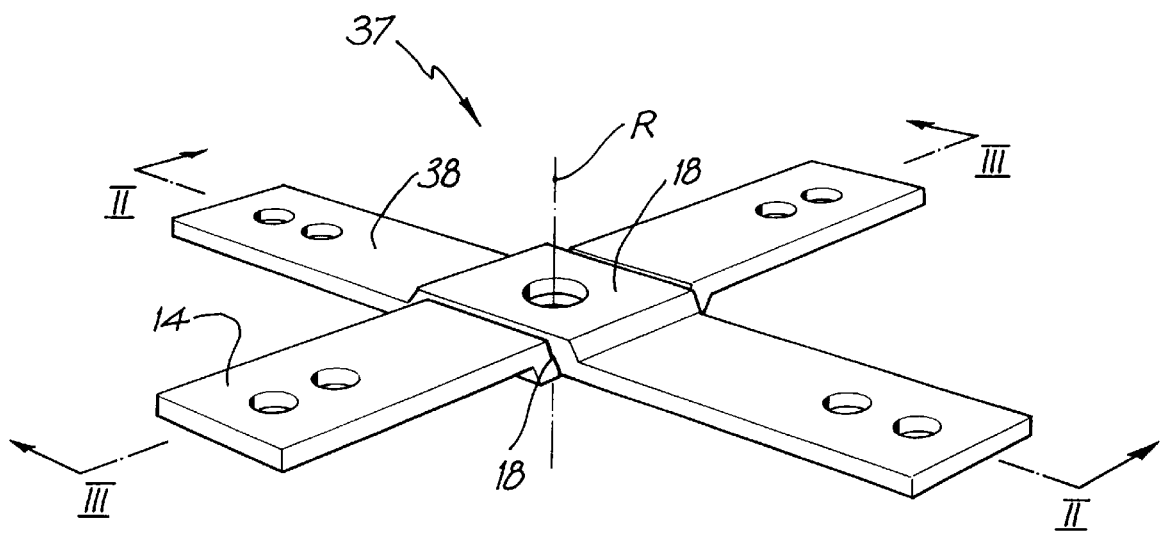
FIG. 4 is a perspective view, similar to FIG. 1, of a dual blade assembly in accordance with a second embodiment.

Referring to FIG. 4, there is shown a second embodiment of a dual blade assembly 37 in which the first blade 12 is replaced with a blade 38, which is substantially identical to second blade 14. Therefore, the dual blade assembly 37 comprises two substantially identical blades 14 and 38, each of which has a central deformation 18, shaped to receive the respective blade. Each of the central deformations 18 displaces the respective blade surfaces 20 and 24 by the blade thickness $t_b$ (approximately 2 mm).

Figure 5:
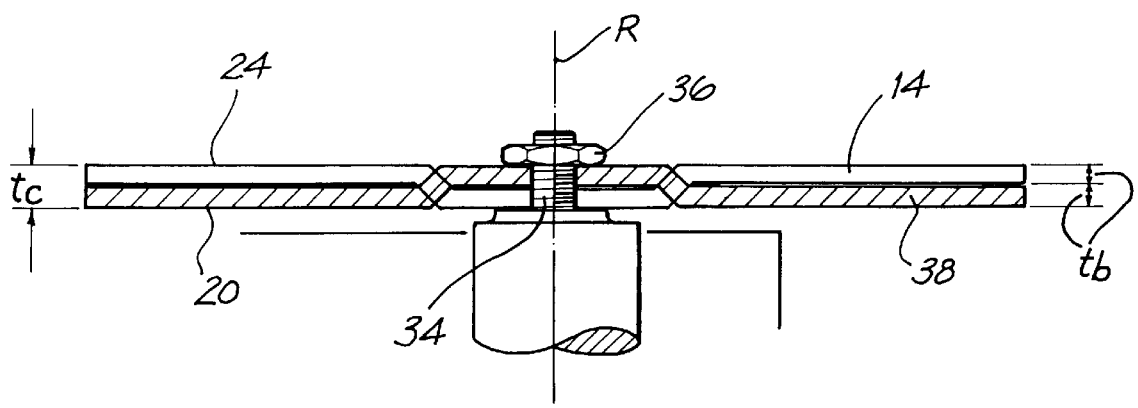
FIG. 5 is a schematic sectional view of the dual blade assembly of FIG. 4 together with a fastener to demonstrate the attachment to a lawn edging implement he hatched blade shown is as viewed along the line II—II of FIG. 4, whilst the non-hatched blade shown is as viewed along the line III—III of FIG. 4.

FIG. 5 is a composite cross-sectional view of the dual blade assembly of FIG. 4 attached to a shaft 34, Each blade 14, 38 is illustrated along the corresponding cross-sectional line II—II and III—III respectively, in order to demonstrate the relative positioning of each blade 14 and 38. This results in a cutting width $t_c$ into the grass which is approximately twice the blade thickness $t_b$ of the individual blades (approximately 4 mm). As a result, there is a strip approximately 4 mm wide extending from the edge of a concrete path (for example) within which there is no vegetation. This result is sometimes preferred by some operators since the grass takes a longer period to grow back over the wider edging cut.

Figure 6:
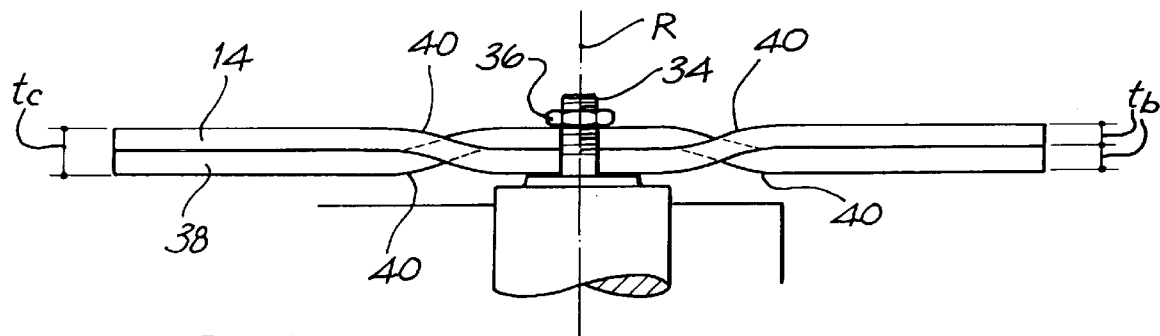
FIG. 6 is a sectional side view of a dual blade assembly in accordance with a third embodiment.

FIG. 6 similarly illustrates a third embodiment which is a variation of the second embodiment of FIG. 5, again using substantially similar blades 14 and 38, but in which the right angled bend regions 26 adjacent the central deformations 18 have been replaced by smoother bend regions 40 of a shallow angle. This reduces the likelihood of stress concentration in the blades 14 and 38.

Figure 7:
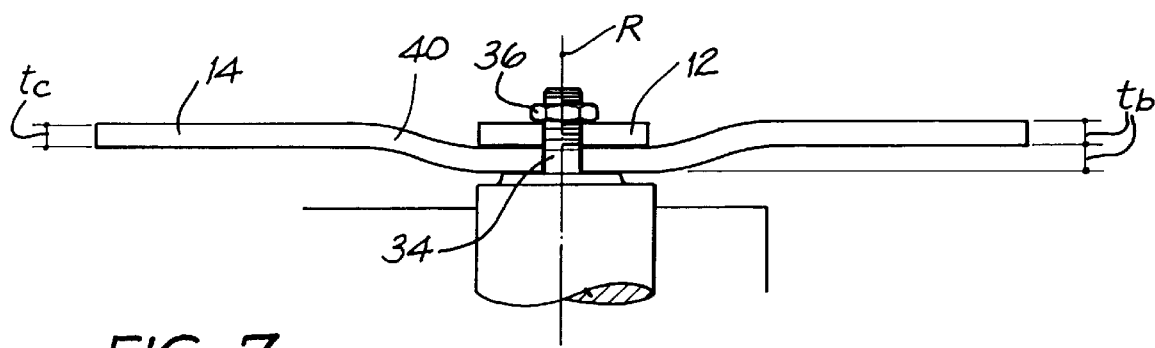
FIG. 7 is a sectional view, similar to that of FIG. 3, of a dual blade assembly, in accordance with a fourth embodiment.

FIG. 7 shows a fourth embodiment using the shallow bend regions 40 of the third embodiment on the blade 14 in conjunction with the flat blade 12 of the first embodiment. In this embodiment, the cutting width $t_c$ substantially equals the blade thickness $t_b$ (approximately 2 mm).

Figure 8:
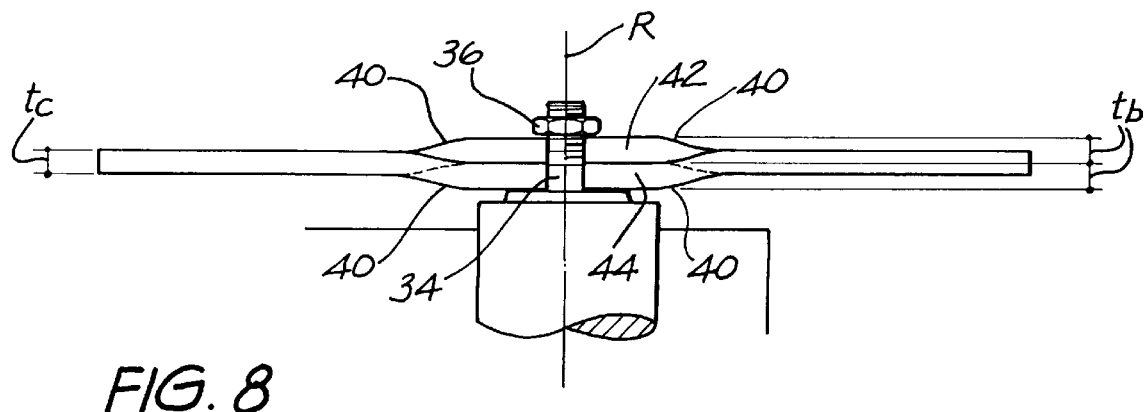
FIG. 8 is a sectional view, similar to that of FIG. 6, of a dual blade assembly in accordance with a fifth embodiment.
Figure 9:
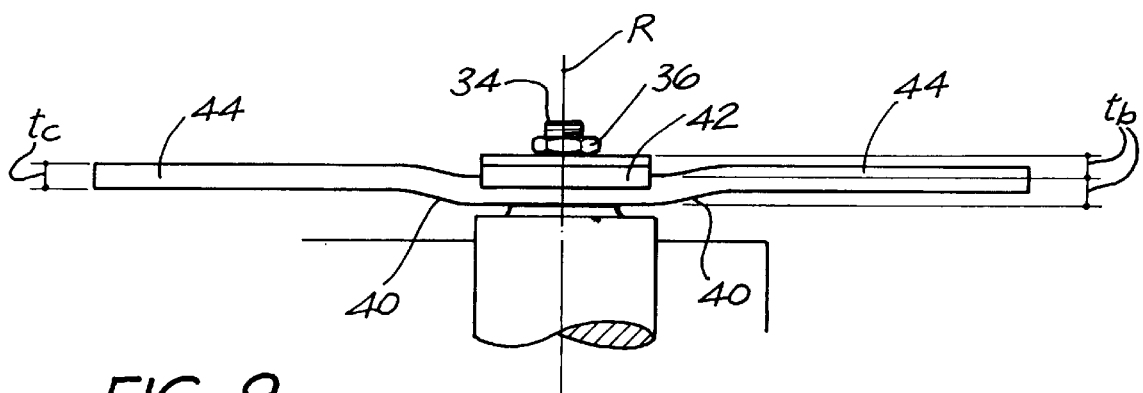
FIG. 9 is a side view of he fifth embodiment of FIG. 8.

FIGS. 8 and 9 shows a fifth embodiment in which blades 42 and 44 each utilise shallow bends 40 to displace the central deformations 18 from their respective and regions 20 by approximately half the blade thickness $t_b$ (i.e. by approximately 1 mm).

When this embodiment is assembled, as shown, the cutting width $t_c$ substantially equals the blade thickness $t_b$ (approximately 2 mm).

Figure 10:
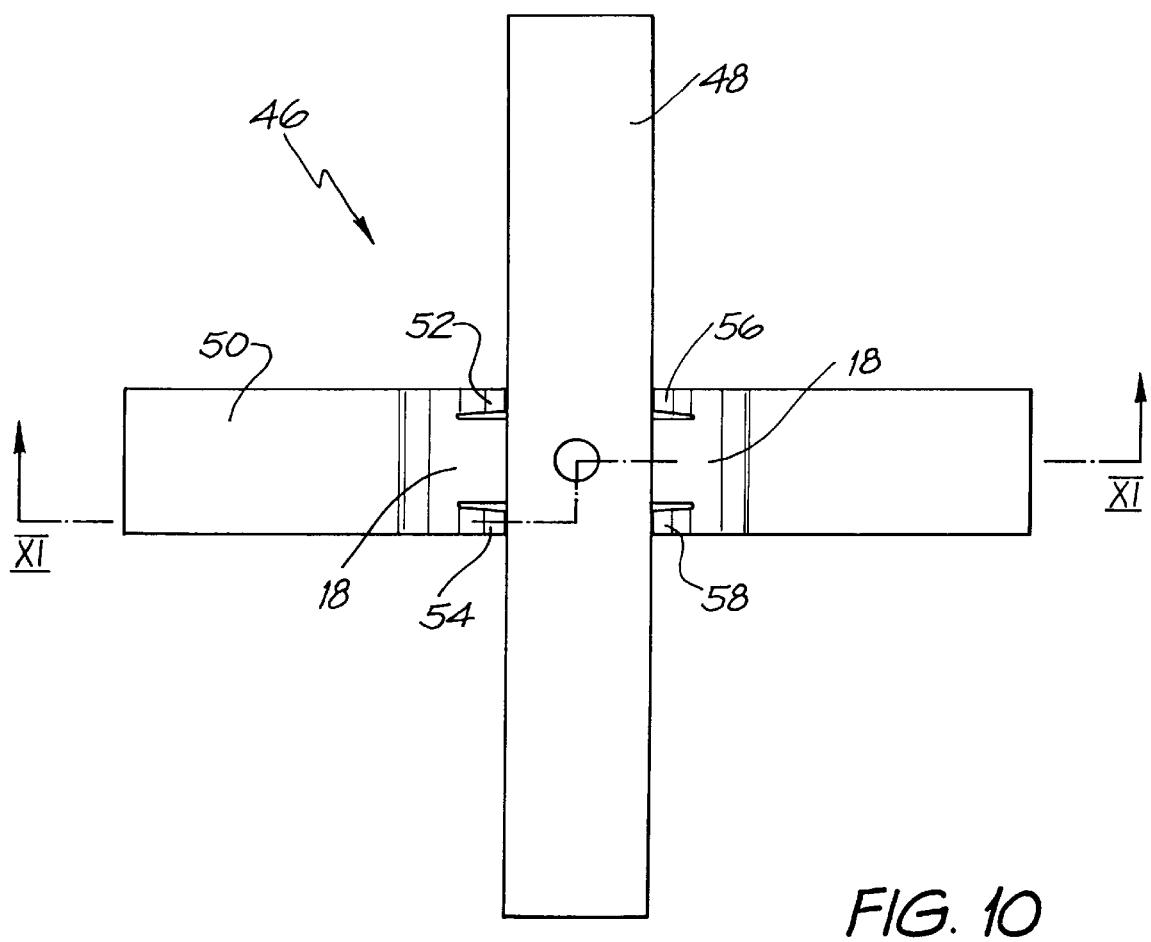
FIG. 10 is a plan view of a dual blade assembly in accordance with a sixth embodiment.

FIGS. 10 illustrates in plan view a sixth embodiment of a dual blade assembly 46, similar to that shown in FIG. 1, but which has improved blade torque resisting properties. A first blade 48 and a second blade 50 are provided. The central deformation 18 along the length of second blade 50 is significantly wider than the width of the first blade 48. A torque resisting arrangement for the two blades 48 and 50, is provided on the second blade 50 by at least two, but preferably four, tangs 52, 54, 56 and 58, pushed up from the surface of the central deformation 18.

Figure 11:
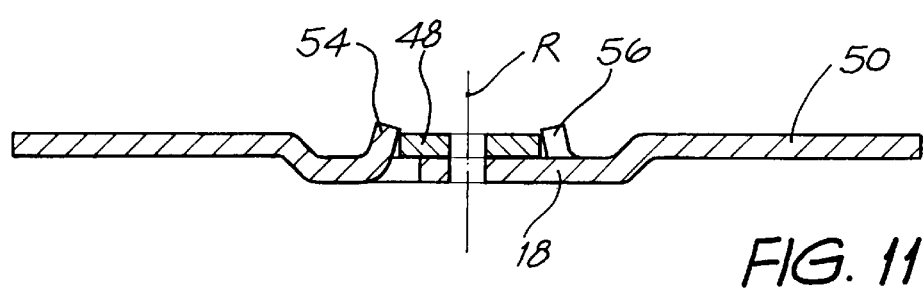
FIG. 11 is a sectional view of he dual blade assembly of FIG. 10 along the line XI—XI of FIG. 10.

FIG. 11 illustrates the arrangement of FIG. 10 when viewed along the line XI—XI of FIG. 10 and shows how the tangs 54 and 56 are uplifted relative to the surface of the central deformation 18.

Figure 12:
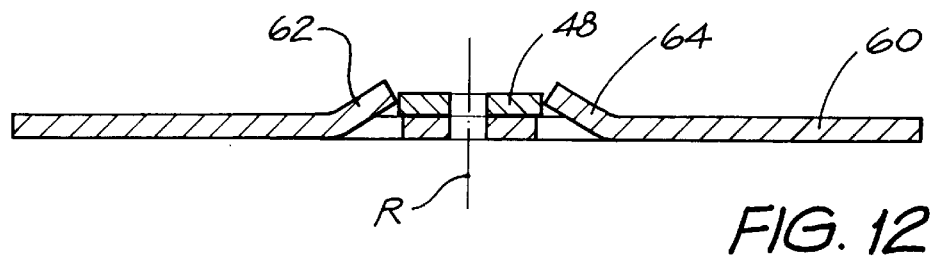
FIG. 12 is a sectional side view, similar to FIG. 10, of a dual blade assembly in accordance with a seventh embodiment.

FIG. 12 illustrates (in the same manner as FIG. 11) a seventh embodiment generally similar to that of FIGS. 10 and 11, but with a modified second blade 60 having at least two tangs 62 and 64 pushed up from the (undeformed) central surface of the second blade 60. If both the blades 48 and 60 are each 2 mm thick, then the cutting width $t_c$ this embodiment is approximately twice the blade thickness $t_b$ (i.e. approximately 4 mm). Again, at least two, but preferably four, tangs, substantially spaced apart at the width of blade 48, are provided as torque resisting abutments.

Figure 13:
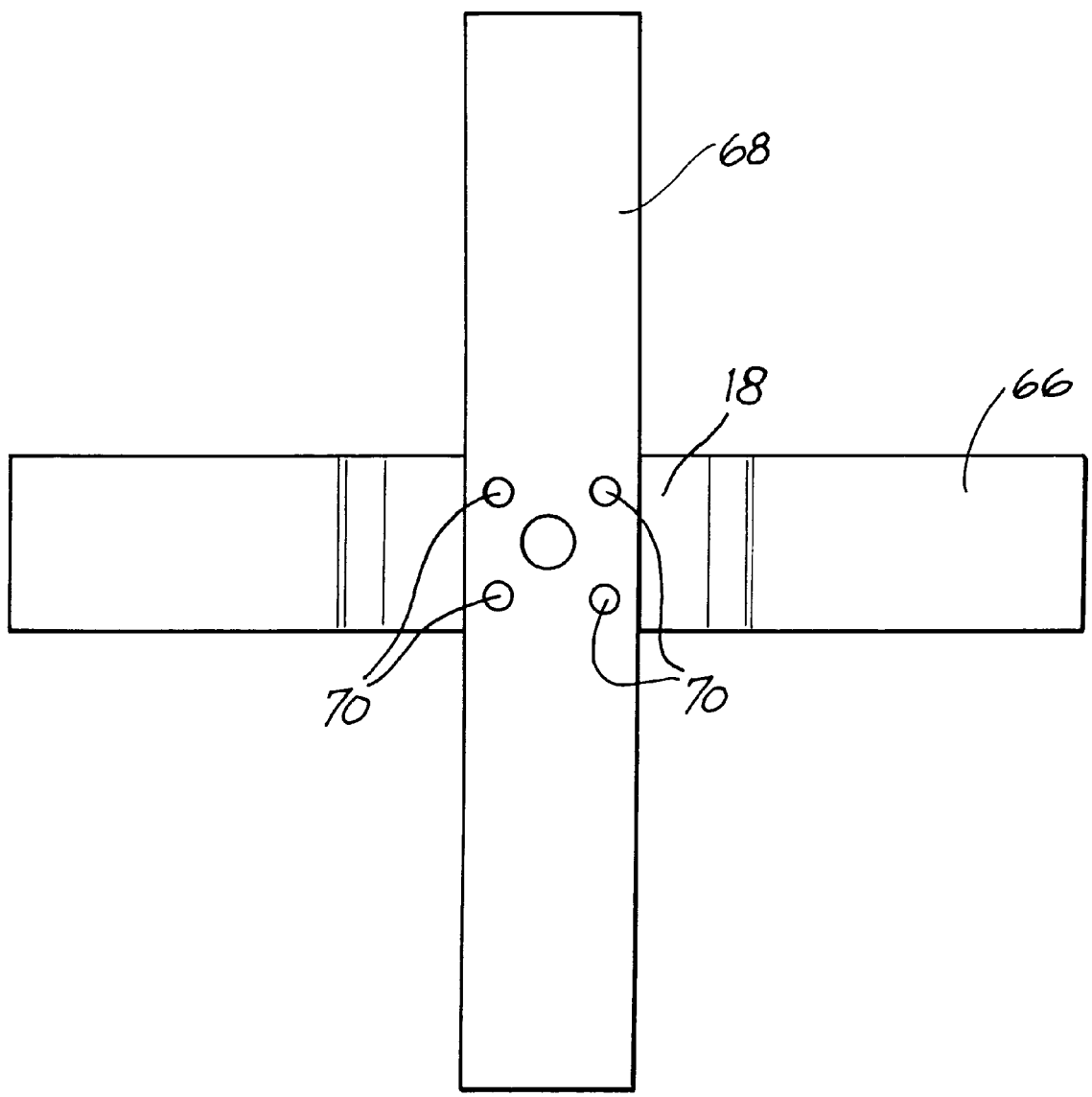
FIG. 13 is a plan view of a dual blade assembly in accordance with a eighth embodiment.

FIG. 13 illustrates an eighth embodiment, similar to that of FIG. 7, but having one blade 66 with a central deformation 18, in which a flat blade 68 is positioned. This results in the outer surfaces of the blade 66 being substantially level with the corresponding surfaces of the blade 68 and results in a cutting width $t_c$ equal to the blade thickness $t_b$. At least one rivet 70 (and preferably four as illustrated) pass between the blades 66 and 68 to provide a torque resistance mechanism between the blades 66 and 68.

Figure 14:
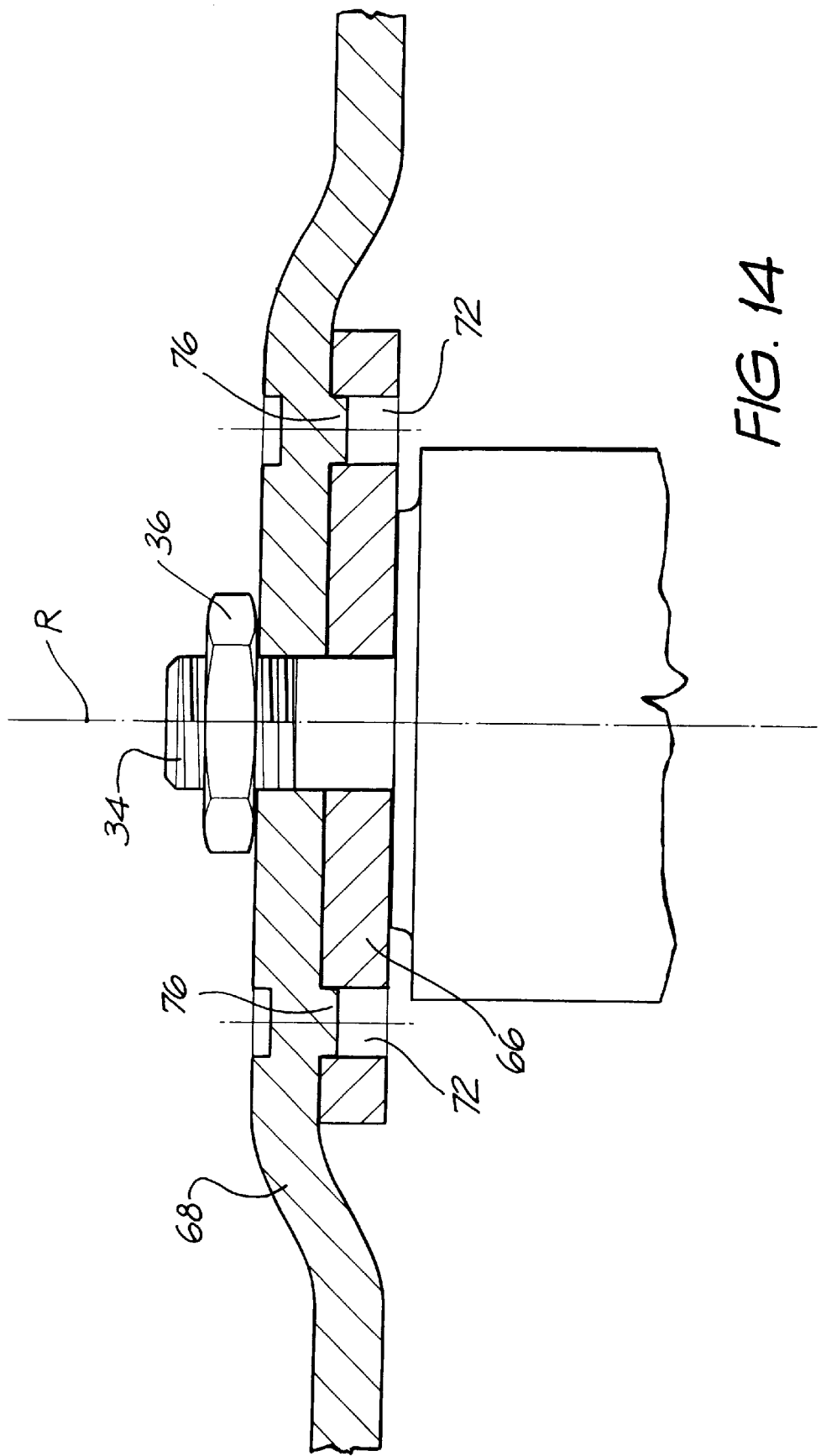
FIG. 14 is a partial sectional side view of a dual blade assembly in accordance with a ninth embodiment.

FIG. 14 shows a ninth embodiment similar to that of FIG. 13 in which the blade 66 includes one or more, preferably four, holes or recesses 72. The other blade 68 is stamped or pressed upon its outer surface 74 to deform a corresponding number of mating protuberances or spigots 76. When the blades 66 and 68 are assembled as shown, the spigots 76 engage the holes 72 and provide a torque resisting mechanism between the blades 66 and 68. This embodiment avoids the use and cost of rivets or other like fasteners.

Those of the foregoing embodiments which provide a cutting width $t_c$ of equal to or less than twice the blade width $t_b$, thereby provide a in and neat cutting path. Further, by reversing one or more of the blades to displace the end regions away from the other blade or blades, the cutting width $t_c$ can be increased.

Figure 15:
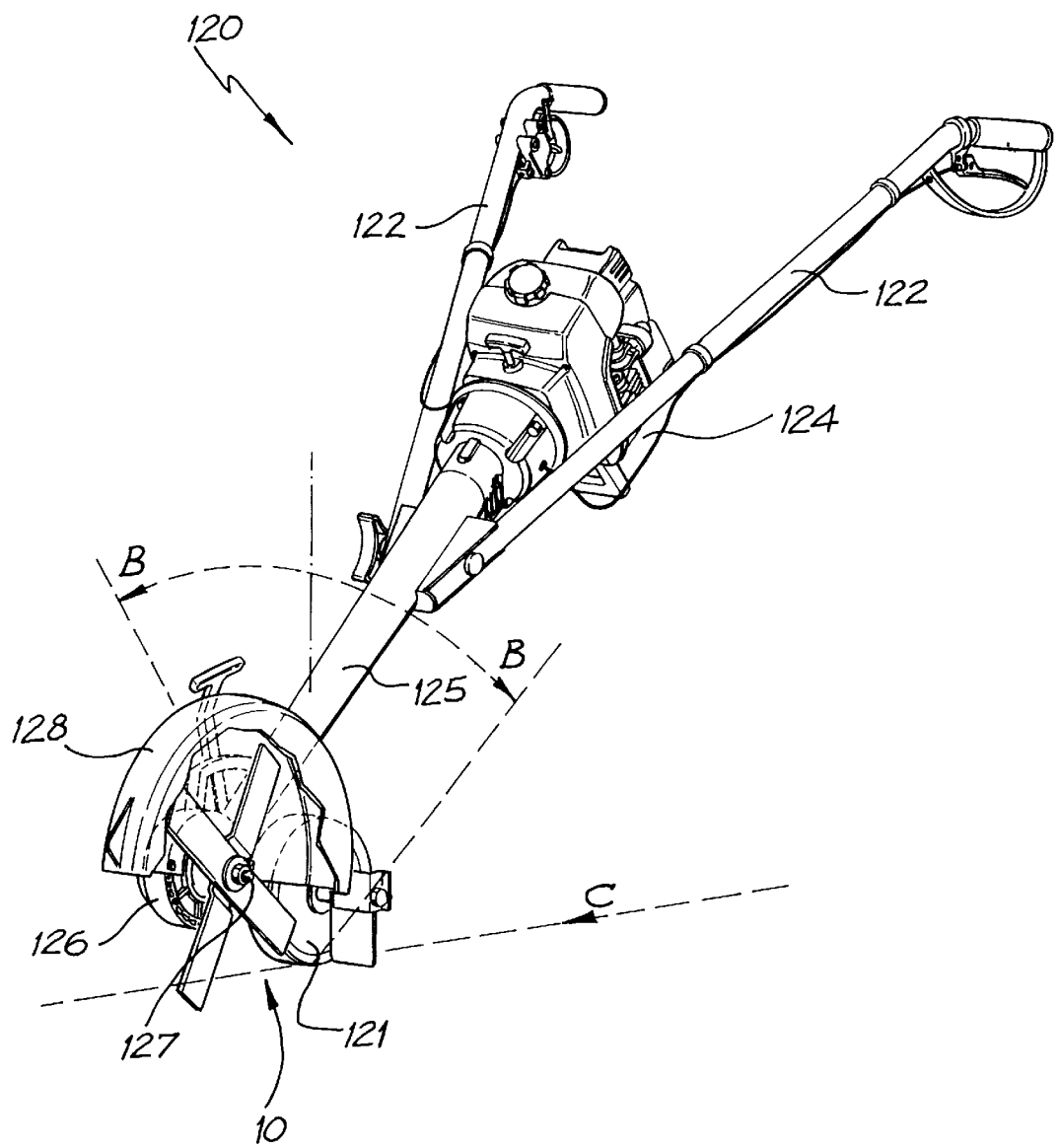
FIG. 15 is a perspective view of a lawn edging implement, together with the dual blade assembly of FIG. 1 attached.

FIG. 15 shows one example of a lawn edging implement 120 with the dual blade assembly 10 of FIG. 1 attached thereto instead of a conventional single blade.

The implement 120 has a single ground engaging wheel 121, a pair of handle bars 122 and a power unit or motor 124. The wheel 121 has a sufficiently large diameter to enable the implement 120 to be easily rolled like a wheelbarrow including rolling over steps, rough terrain, lawn, tangled grass, garden bed peripheries, etc.

The motor 124 can be either an electric motor or any type of internal combustion engine. The motor 124 is positioned in front of the operator and is mounted at the head of the transmission frame 125 and is generally provided with a conventional speed dependent centrifugal clutch, and a gear box 126.

Extending from the gear box 126 is a shaft 127 which carries the dual blade assembly 10 which is shielded by a guard 128 (illustrated partly cut away). The dual blade assembly 10 and shaft 127 are driven by the engine 24.

The gear box 126 provides a gear reduction of nominally 3.5;1 with an engine of, say, 30 cc capacity. Because of the low gear ratio, the peripheral speed at the tips of the dual blade assembly 10 is kept low, even at engine speeds of up to 10,000 rpm. The two blades with four contact cutting edges provide less "chatter" during operation and a more even pulling action as the implement 120 causes the blade tips to engage with the grass. In this connection it will be appreciated that the blade assembly 10 rotates in the counter-clockwise direction as seen in FIG. 15.

Another advantage of this is when edging against a concrete footpath, or the like, that has excessive vegetation growing over the footpath, Under these circumstances, the outer portions of the blades glance against (or rub along) the concrete edge, which enables the operator to follow the unseen concrete edge. Since one cutting edge of the blade arrangement 10 is thus always in contact with, or glancing against, the concrete edge, the blades act as a guiding mechanism.

Figure 16:
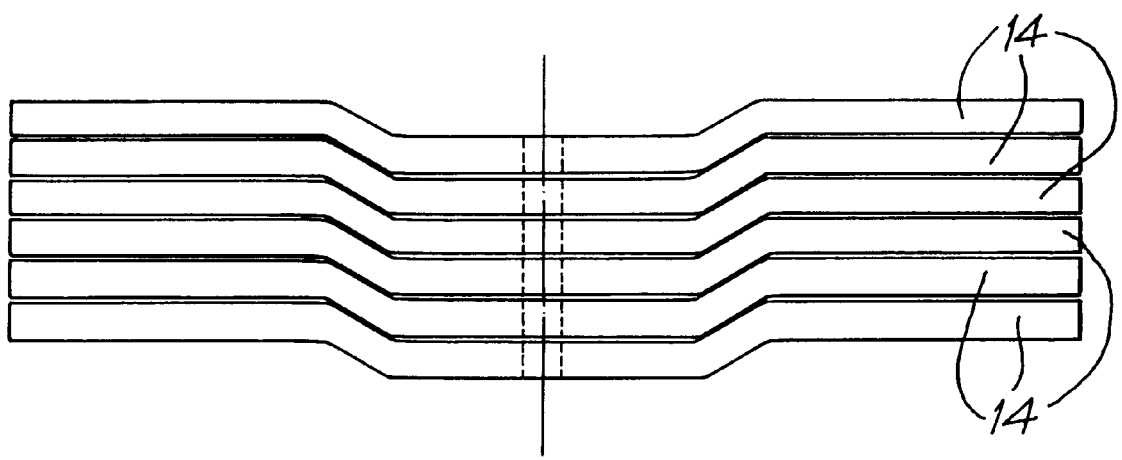
FIG. 16 is a sectional view of a plurality of blades in accordance with an embodiment of the present invention stacked together in storage.

A further advantage of the blades 14 of these arrangements will be apparent from FIG. 16, where the blades 14 can be neatly stacked or nested, one on top of one another to minimise the physical space used, in the distribution and storage stages of production.

Figure 17:
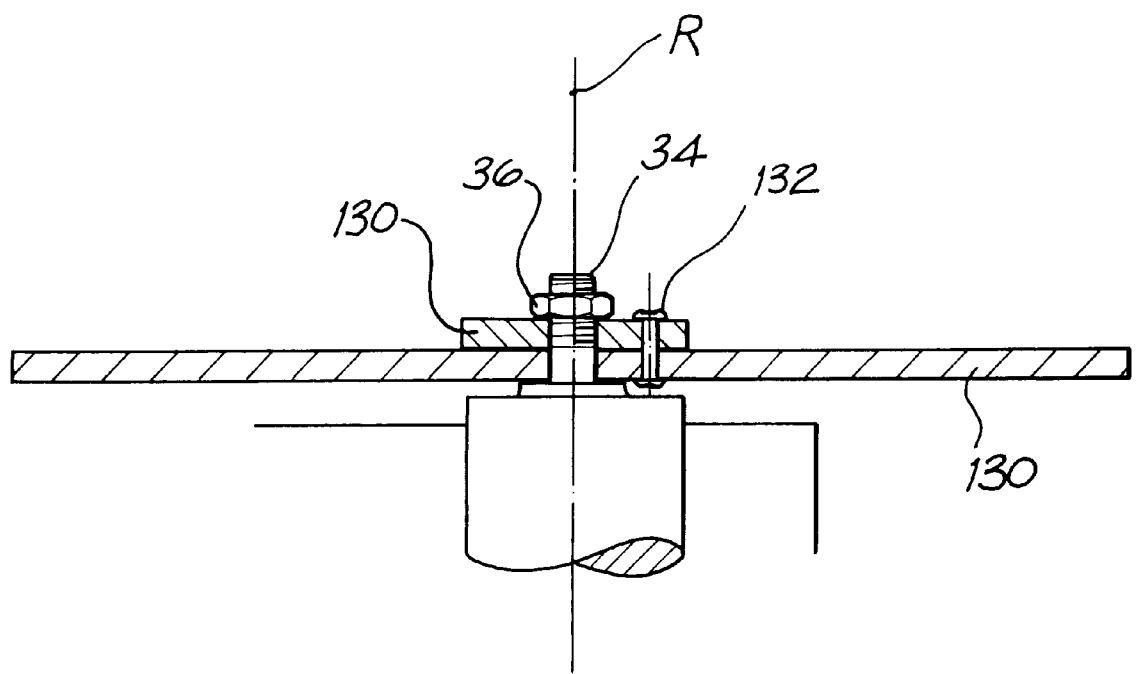
FIG. 17 is a schematic sectional side view, similar to FIG. 10, of an arrangement of a dual blade assembly.

FIG. 17 illustrates an arrangement of a "double thickness" blade assembly having a cutting width $t_c$ equal to twice the blade thickness $t_b$ using two flat blades 130, each 2 mm thick. The blades 130 are fastened together with at least one fastener 132, for example a rivet, which in conjunction with the central shaft 34, provides a torque resisting arrangement to prevent the blades 130 from rotating relative to one another. An alternative torque resistant arrangement using the double thickness blade assembly is to use the spigot and hole arrangement of FIG. 14 and/or the tang arrangement of FIGS. 10 to 12.

Figure 18:
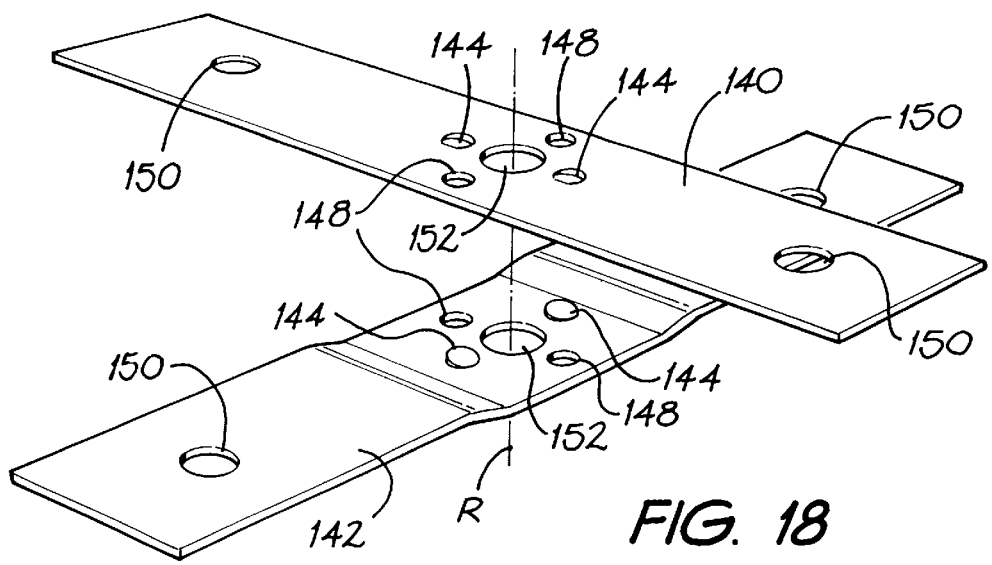
FIG. 18 is an exploded perspective view of a dual blade assembly in accordance with a tenth embodiment.
Figure 19:
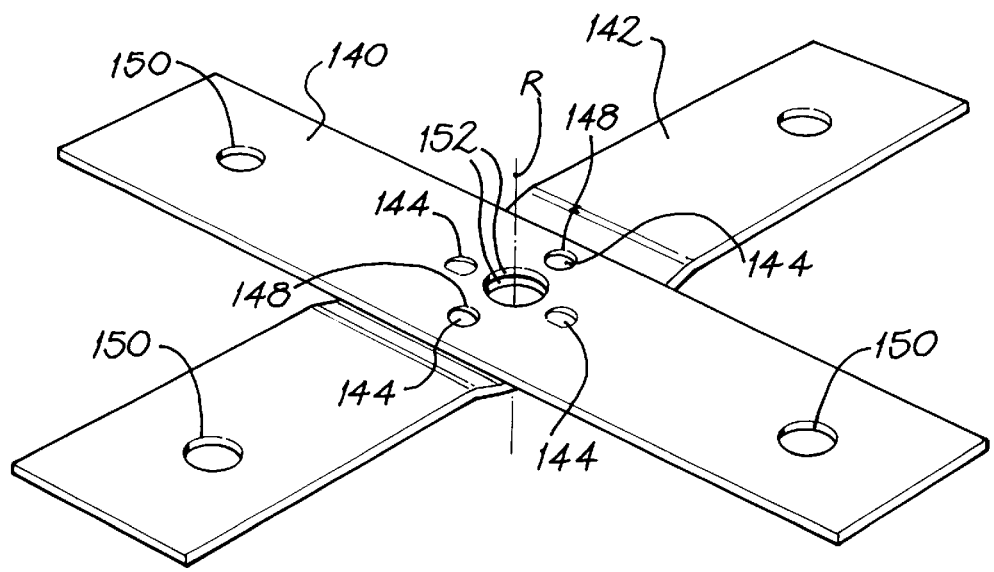
FIG. 19 is an assembled perspective view of the tenth embodiment of FIG. 18.
Figure 20:
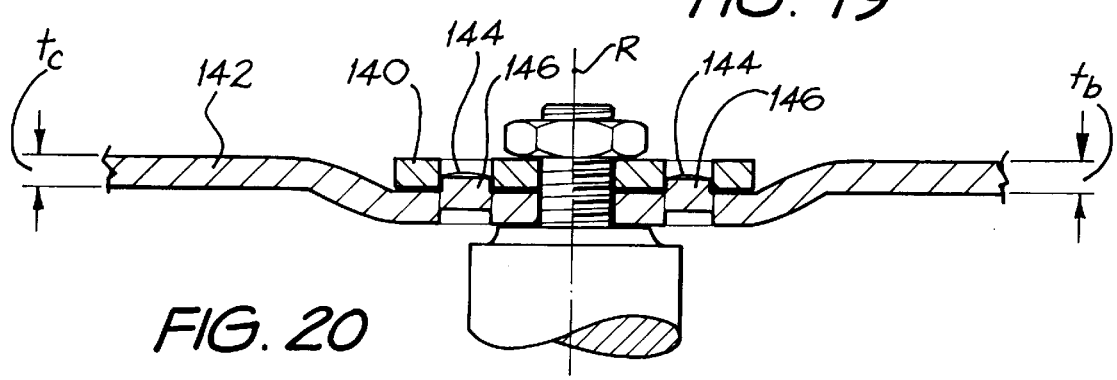
FIG. 20 is a cross sectional side view of the tenth embodiment of FIGS. 18 and 19.

FIGS. 18 to 20 illustrate an arrangement of a "single thickness" blade assembly having a cutting width $t_c$ equal the blade thickness $t_b$ using one flat blade 140 and one deformed blade 142, each 2 mm thick. Each of the blades 140, 142 include a pair of protuberances 144 formed by stamping one side of the blade material so as to displace a portion of blade material 146 (see FIG. 20) of the thickness of the blades 140, 142. The stamping creates a depression on the stamped side of the blade and the raised protuberances 144, of equal height to the depression depth, on the other side of the blade. Each of the blades 140, 142 also includes a pair of recesses 148 formed by punching holes in the blades 140, 142. It is important to note that location and size of the protuberances 144 and recesses 148 are identical in each of the blades 140, 142.

When the blades 140, 142 are assembled in a cross shaped configuration (as shown), the protuberances 144 of one of the blades engage the recesses 148 of the other blade and vice versa to provide a torque resistance mechanism between the blades 140, 142.

Figure 21:
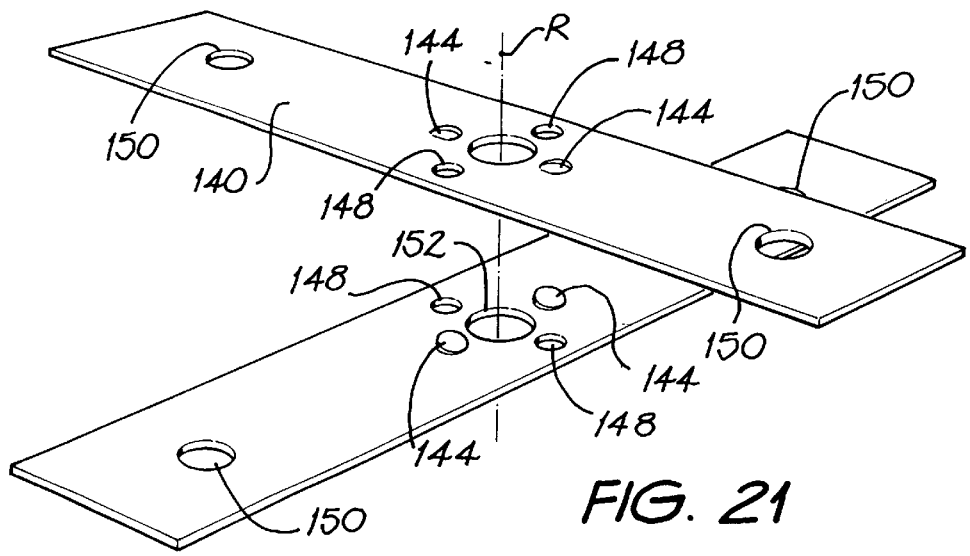
FIG. 21 is an exploded perspective view of a dual blade assembly in accordance with an eleventh embodiment.
Figure 23:
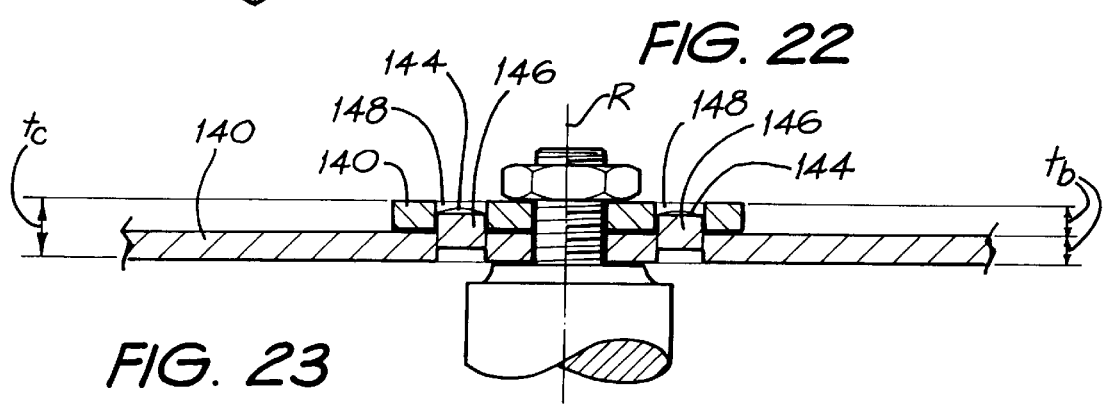
FIG. 23 is a cross sectional side view of the eleventh embodiment shown in FIGS. 21 and 22.

FIGS. 21 and 23 illustrates an equivalent arrangement to that shown in FIGS. 18 to 20 but using two flat blades 140 to provide a "double thickness" blade assembly having a cutting width $t_c$ equal to twice the blade thickness $t_b$.

Figure 22:
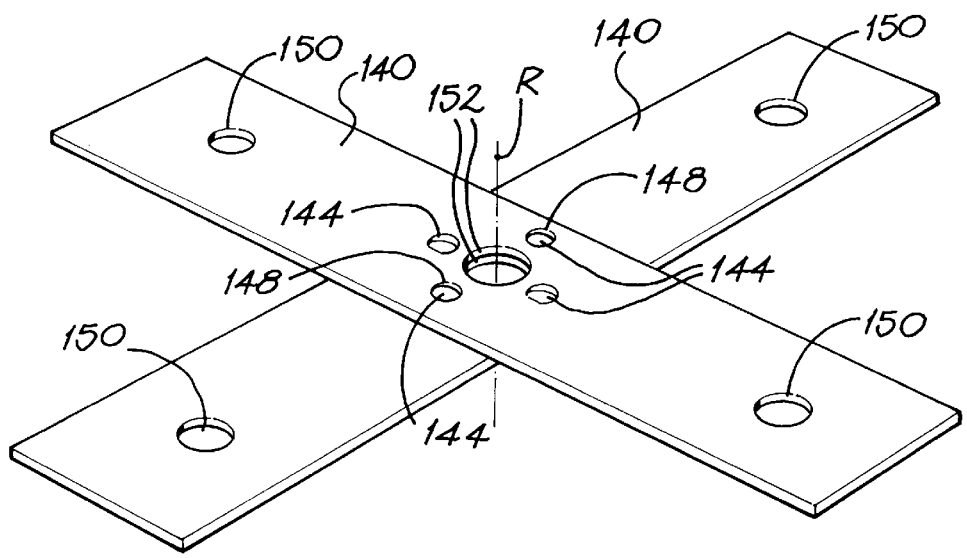
FIG. 22 is an assembled perspective view of the eleventh embodiment of FIG. 21.

A particular advantage associated with the embodiments shown in FIGS. 18 to 20 and FIGS. 21 to 23 is that the protuberances/recesses torque resistant mechanism is identical in both blades which simplifies manufacture and, in the case of the double thickness blade assembly shown in FIGS. 21 to 23, reduces inventory as two identical blades are used.

The blades 140, 142 also each have one central hole 152 for attachment to a lawn edger and two outer holes 150. The three holes 150, 152 allow a number of blades to be bolted together in a stacked configuration (similar to that shown in FIG. 16), which reduces warpage during heat treatment.

Numerous modification and alterations, apparent to one skilled in the art, can be made to the described embodiments without departing from the spirit and scope of the present invention. For example, the central deformations can be configured to allow the blades to sit in a St Andrew's cross arrangement rather than a St George's cross as illustrated.

Further, any of the above blade arrangements can also be used with a vertical (rather than horizontal) shaft for example in a vegetation brush cutter, string trimmer (i.e. a line trimmer or "WHIPPER SNIPPER" [Trade Name]), or the like. Also, any of the torque resisting arrangements described can be used in combination with any of the embodiments of the dual blade assemblies.

All such modifications and alterations are to be considered within the scope of the present invention, embodiments of which have been hereinbefore described.

We claim:

1. A dual blade assembly for a lawn edger, the assembly comprising first and second generally rectangular blades arranged in a substantially cross shaped configuration for rotation about a substantially central axis, each of the first and second blades having: a central region between two end cutting regions; at least one protuberance in the central region; and at least one recess in the central region, wherein the at least one protuberance of one of the first and second blades is adapted to engage with the at least one recess of the other of the first and second blades to counteract relative movement between the first and second blades about the rotational axis.

2. A dual blade assembly as claimed in claim 1, wherein the recesses are formed by punching holes in the first and second blades.

3. A dual blade assembly as claimed in claim 1, wherein the protuberances are formed by stamping one side of the first and second blades such that displaced blade material protrudes from the other side of the first and second blades.

4. A dual blade assembly as claimed in claim 1, wherein the first and second blades each include two protuberances and two recesses.

5. A dual blade assembly as claimed in claim 4, wherein the two protuberances and two recesses are each equiangularly spaced about the rotational axis at a common radius.

6. A dual blade assembly as claimed in claim 1, wherein each of the first and second blades are substantially flat such that the cutting width of the blade assembly is substantially equal to twice the thickness of one of the first and second blades.

7. A dual blade assembly as claimed in claim 1, wherein one of the first and second blades is substantially flat and the other of the first and second blades has its end regions displaced axially from its central region such that the cutting width of the blade assembly is substantially equal to the thickness of the substantially flat first or second blade.

8. A lawn edger including a dual blade assembly as claimed in claim 1.

* * * * *